(12) United States Patent
Hurst-Hiller et al.

(10) Patent No.: US 7,293,017 B2
(45) Date of Patent: Nov. 6, 2007

(54) PRESENTATION-LEVEL CONTENT FILTERING FOR A SEARCH RESULT

(75) Inventors: Oliver Hurst-Hiller, Seattle, WA (US); Jamie Paul Buckley, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 573 days.

(21) Appl. No.: 10/882,930

(22) Filed: Jul. 1, 2004

(65) Prior Publication Data

US 2006/0004716 A1 Jan. 5, 2006

(51) Int. Cl.
*G06F 17/30* (2006.01)
*G06F 7/00* (2006.01)

(52) U.S. Cl. .................. 707/3; 707/101; 707/6
(58) Field of Classification Search .......... 707/101, 707/104.1, 3, 6
See application file for complete search history.

(56) References Cited

U.S. PATENT DOCUMENTS

| | | | |
|---|---|---|---|
| 5,887,133 A * | 3/1999 | Brown et al. ............ 709/200 |
| 6,295,559 B1 | 9/2001 | Emens et al. |
| 6,336,117 B1 | 1/2002 | Massarani |
| 6,389,472 B1 * | 5/2002 | Hughes et al. ........... 709/229 |
| 6,484,166 B1 * | 11/2002 | Maynard .................... 707/5 |
| 6,493,744 B1 | 12/2002 | Emens et al. |
| 6,526,440 B1 | 2/2003 | Bharat |
| 6,529,903 B2 | 3/2003 | Smith et al. |
| 6,615,209 B1 | 9/2003 | Gomes et al. |
| 6,658,423 B1 | 12/2003 | Pugh et al. |
| 6,665,838 B1 | 12/2003 | Brown et al. |
| 6,678,681 B1 | 1/2004 | Brin |
| 7,024,415 B1 * | 4/2006 | Kreiner et al. ............ 707/101 |
| 7,130,981 B1 * | 10/2006 | Nachenberg ............. 711/170 |
| 7,167,875 B2 * | 1/2007 | Brown et al. .......... 707/104.1 |
| 7,185,049 B1 * | 2/2007 | Benitez et al. ........... 709/203 |
| 2002/0103914 A1 | 8/2002 | Dutta et al. |
| 2002/0123988 A1 | 9/2002 | Dean et al. |
| 2002/0133481 A1 | 9/2002 | Smith et al. |
| 2002/0178381 A1 * | 11/2002 | Lee et al. ................. 713/201 |
| 2004/0002962 A1 | 1/2004 | Banerjee et al. |
| 2004/0158732 A1 * | 8/2004 | Kissel ...................... 713/200 |
| 2004/0207878 A1 * | 10/2004 | Ferlitsch .................. 358/2.1 |

OTHER PUBLICATIONS

Chen et al., "Bringing Order to the Web: Automatically Categorizing Search Results," Proceedings of the SIGCHI Conference on Human Factors in Computing Systems, 2000, pp. 145-152, ACM Press, New York, U.S.A.

(Continued)

*Primary Examiner*—Kuen S. Lu
(74) *Attorney, Agent, or Firm*—Senniger Powers

(57) ABSTRACT

Presenting a search result to a user. One or more electronic documents are identified based on a search query received from a user. A search result is generated in response to identifying the one or more electronic documents. The search result includes presentation data regarding each of the identified electronic documents. An undesirable content of each of the presentation data of each of the identified electronic documents of the search result is identified. A format attribute of the presentation data of the identified undesirable content is modified. The search result including any modifications is then provided to the user.

37 Claims, 6 Drawing Sheets

OTHER PUBLICATIONS

Paepcke et al., "Beyond Document Similarity: Understanding Value-Based Search and Browsing Technologies," ACM SIGMOD Record, 2000, pp. 80-92, ACM Press, New York, U.S.A.

Pitkow et al., "Personalized Search," Communications of the ACM, 2002, pp. 50-55, ACM Press, New York, U.S.A.

"Net Nanny 5 Child Safety Software for the Internet," User Guide, Nov. 10, 2003, 63 pages, BioNet Systems, LLC, Issaquah, Washington, U.S.A.

Brin et al., "The Anatomy of a Large-Scale Hypertextual Web Search Engine," Aug. 7, 2000, pp. 1-18.

* cited by examiner

PRESENTATION-LEVEL CONTENT FILTERING FOR A SEARCH RESULT

TECHNICAL FIELD

Embodiments of the present invention relate to the field of searching for relevant data entities using a communications network. In particular, embodiments of the invention relate to filtering presentation data included in a search result to avoid presenting an undesirable content to a user.

BACKGROUND OF THE INVENTION

The Internet has vast amounts of information distributed over a multitude of computers, hence providing users with large amounts of information on various topics. This is also true for a number of other communication networks, such as intranets and extranets. Although large amounts of information may be available on a network, finding the desired information may be difficult.

Search engines have been developed to address the problem of finding desired information on a network. Typically, a user who has an idea of the type of information desired enters one or more search terms to a search engine. The search engine then provides a search result, which includes a list of network locations (e.g., uniform resource locators (URLs)) that the search engine has determined to include an electronic document relating to the user-specified search terms. Alternately, a user may browse through information located on the network, as for example, when the user is not sure what information is wanted. Some search engines provide categories of information and categories within those categories for selection by the user, who may thus focus on an area of interest from these categories.

One problem associated with providing a search result to a user is that the provided search result may point to an electronic document that presents an undesirable content to the user. For example, depending on a particular search term, the search result may direct the user to an electronic document relating to sex education, mature content, pornography, gambling, hate speech, alcohol, drugs, tobacco, bomb-making, weapons, etc. To avoid presenting an electronic document having such an undesirable content to a user, presently available search engines collect electronic documents from a communications network and classify these electronic documents according to one or more categories. When such search engines generate a search result in response to a search term submitted by a user, they check the classifications of the collected electronic documents indexed in a memory area. If the classification of a particular electronic document suggests that the electronic document provides an undesirable content, existing search engines then exclude the electronic document from the search result. That is, such search engines filter the search result based on the classifications of the collected electronic documents. These search engines then present the filtered search result to the user.

Filtering the search result based on a classification of an electronic document may not effectively and efficiently filter a search result on its own. First, offline analysis of an electronic document for categorization is computationally expensive. For example, a presently available search engine may crawl and index fifty electronic documents per second if the search engine does not analyze the electronic documents for categorization. But if the search engine analyzes electronic documents to determine classifications of the electronic documents, the rate of crawling and indexing may be reduced to twenty-five electronic documents per second.

Additionally, because of the vast amount of electronic documents that are collected from a communications network, existing search engines sometimes fail to accurately categorize some of the electronic documents. Thus, such search engines may fail to effectively exclude an electronic document having an undesirable content from a search result. Consequently, currently available search engines may still inadvertently present a search result that includes an undesirable electronic document to a user.

Moreover, presentation data (e.g., a title, description, URL, etc.) regarding an electronic document and presented by a search result may also include an undesirable content such as an offensive language. Presently available search engines fail to provide a mechanism to prevent presenting a search result that include undesirable presentation data to a user.

Accordingly, a solution that more effectively provides a search result without presenting an undesirable content to a user is desired.

SUMMARY OF THE INVENTION

Embodiments of the invention overcome one or more deficiencies in the prior art by providing, among other things, presentation of a search result that includes presentation data without an undesirable content. According to one embodiment of the invention, a secondary content filter analyzes presentation data included in a generated search result to determine if the presentation data provides an undesirable content. If the secondary content filter determines that the presentation data provides an undesirable content, then it modifies a format attribute of the presentation data with the undesirable content to avoid a user from viewing the undesirable content or to exclude the presentation data from the search result. In one embodiment of the invention, the secondary content filter may be located on a server computer that serves the search result to the user. Alternatively, the secondary content filter may be located on a client computer that includes a browser for rendering the search result to the user. In this case, the secondary content filter modifies the format attribute (e.g., altering or excluding the presentation data) after the server computer serves the search result to the client but before the browser renders the search result to the user. Embodiments of the invention also allow the secondary content filter to communicate its analysis of presentation data to a primary content categorization filter to improve classification of collected electronic documents. Moreover, the secondary content filter may improve its accuracy and efficiency in detecting an undesirable content of presentation data based on its previous analysis and detection of an undesirable electronic document and/or undesirable presentation data.

In other embodiments of the invention, the primary content categorization filter may be at least partially disabled such that the secondary content filter is more heavily utilized to filter a search result. Since offline analysis of an electronic document by the primary content categorization filter is relatively computationally expensive, disabling or partially disabling the primary content categorization filter to transfer at least some of the filtering process to the secondary content filter may reduce the cost associated with document crawling and indexing.

Briefly described, a method employing aspects of the invention presents a search result to a user. One or more electronic documents are identified based on a search query received from a user, and a search result is generated in response to the one or more identified electronic documents.

The search result includes presentation data regarding each of the identified electronic documents. The method includes identifying an undesirable content of each of the presentation data of each of the identified electronic documents of the search result. The method also includes modifying a format attribute of the presentation data of the identified undesirable content. The method further includes providing the search result including any modifications to the user.

In another embodiment of the invention, a method employing aspects of the invention presents a search result to a user. A search query is received from a user. Each of a plurality of electronic documents has been classified based on one or more categories. The method includes identifying an undesirable electronic document from the plurality of electronic documents in response to the received search query. The undesirable electronic document is identified based on a classification of each of the plurality of electronic documents. The method also includes generating a search result. The search result excludes the identified undesirable electronic document. The method further includes identifying an undesirable content of each presentation data of each electronic document included in the search result. The method also includes varying a format attribute of the presentation data of the identified undesirable content. The method includes providing the search result including any variations to the user.

In yet another embodiment of the invention, a system employing aspects of the invention presents a search result to a user. One or more electronic documents are identified based on a search query received from a user, and a search result is generated in response to the one or more identified electronic documents. The search result includes presentation data regarding each of the identified electronic documents. The system includes a content filter to detect an undesirable content of each of the presentation data of each of the identified electronic documents of the search result. The content filter is further configured to modify a format attribute of the presentation data of the identified undesirable content. The system also includes an interface to present the search result including any modifications to the user.

In further yet another embodiment of the invention, a system employing aspects of the invention presents a search result to a user. The system includes a primary content categorization filter to classify each of a plurality of electronic documents based on one or more categories. The system also includes a query processor to identify an undesirable electronic document from the plurality of electronic documents based on a classification of each of the plurality of electronic documents. The query processor is further configured to generate a search result in response to a search query received from a user. The search result excludes the identified undesirable electronic document. The system further includes a secondary content filter to detect an undesirable content of each presentation data of each electronic document included in the search result. The secondary content filter is further configured to vary a format attribute of the presentation data of the identified undesirable content. The system further includes an interface to present the search result including any variations to the user.

In further yet another embodiment of the invention, computer-readable media employing aspects of the invention have computer-executable components for presenting a search result to a user. One or more electronic documents are identified based on a search query received from a user, and a search result is produced in response to the one or more identified electronic documents. The search result includes presentation data regarding each of the identified electronic documents. The computer-readable media include a filter component for detecting an undesirable content of each of the presentation data of each of the identified electronic documents of the search result. The filter component is further configured to vary a format attribute of the presentation data of the identified undesirable content. The computer-readable media also include an interface component for providing the search result including any variations to the user.

Computer-readable media having computer-executable instructions for performing methods of presenting a search result to a user embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
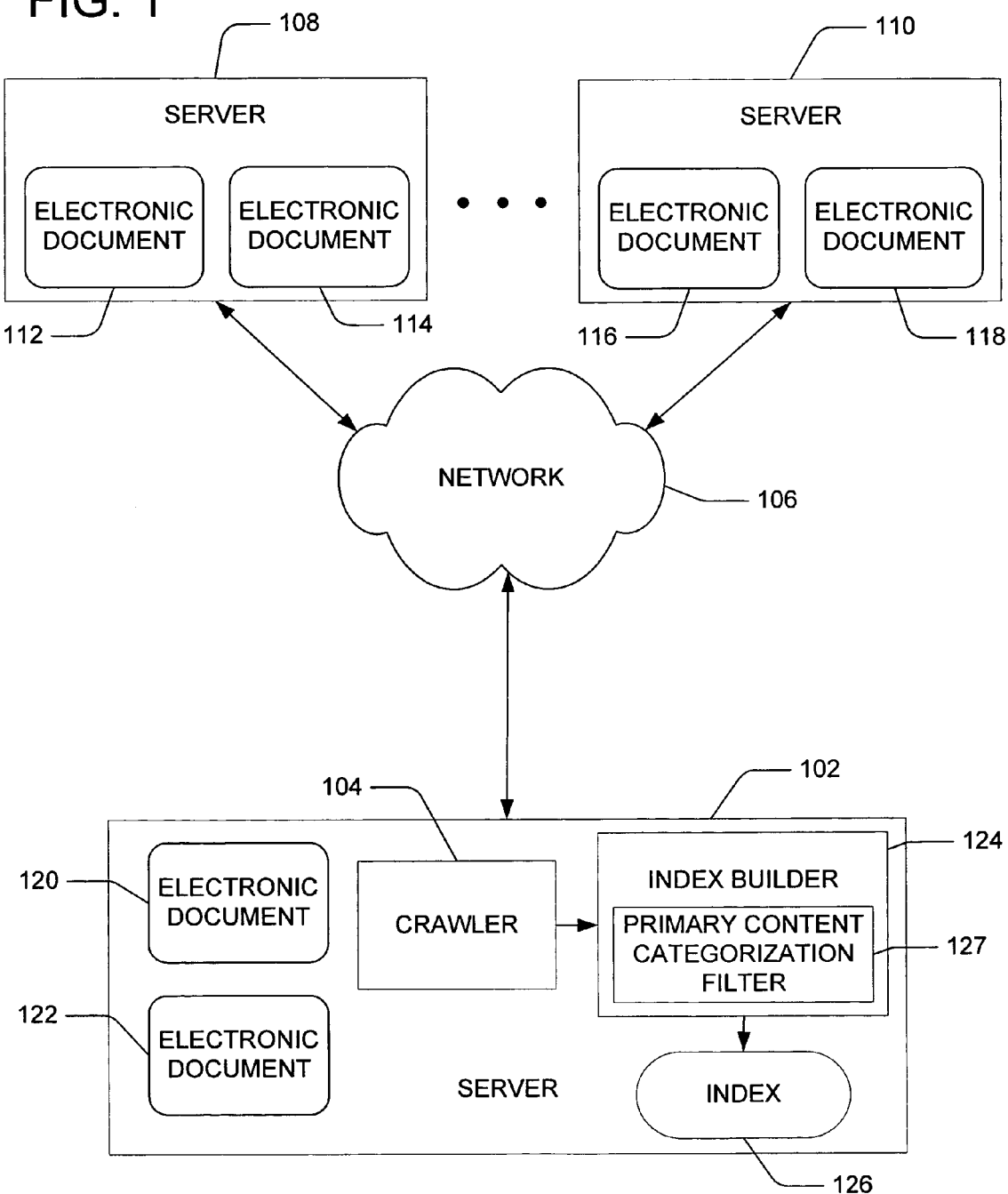
FIG. 1 is a block diagram illustrating an exemplary network environment in which embodiments of the present invention may be utilized.

Referring first to FIG. 1, a block diagram illustrates one example of a suitable network environment in which embodiments of the invention may be utilized. A server computer 102 includes a search engine that has a crawler 104 (or a "spider"). The crawler 104 searches for electronic documents distributed on one or more computers connected to a communications network 106. For example, FIG. 1 illustrates a first remote server computer 108 and an nth remote server computer 110 connected to the communications network 106. Crawler 104 navigates the network 106 to look for one or more electronic documents located on network 106. Communications network 106 may be a local area network such as an intranet or extranet, a wide area network such as the Internet, or a combination of networks that allow the server computer 102 to communicate with remote computers such as the server computers 108 and 110, either directly or indirectly.

The crawler 104 searches server computers 108 and 110 connected to network 106 and finds, for example, electronic documents 112 and 114 stored on server computer 108 and electronic documents 116 and 118 stored on server computer 110. The electronic documents stored on the remote server computers may include web pages (e.g., hypertext markup language (HTML) pages and extensible markup language (XML) pages), multimedia files (e.g., video files, audio files, images, etc.), Really Simple Syndication (RSS) news and blog feeds, shopping and other database feeds, and other document types such as Portable Document Format (PDF) files, word processing files, spreadsheets, etc. Crawler 104 receives these electronic documents and their associated data. Further, server computer 102 may include electronic documents 120 and 122 that crawler 104 may access. Although for purposes of illustration only two electronic documents are shown on each server computer, it is appreciated that a multitude of electronic documents may be accessible via network 106.

Crawler 104 passes the received electronic documents to an index builder 124. The index builder 124 is a computer program that creates and maintains an index 126 of electronic documents. Additionally, index builder 124 includes a primary content categorization filter 127 that parses and analyzes the received electronic documents to generate a classification or label for each of the received electronic documents. In one embodiment of the invention, the primary content categorization filter 127 classifies the received electronic documents according to a number of different categories. For example, primary content categorization filter 127 may analyze a received electronic document to determine a confidence level (e.g., from 0% to 100%) that the electronic document belongs one or more of the following categories: sex education, mature content, pornography, gambling, hate speech, alcohol, drugs, tobacco, bomb-making, weapons, etc.

In general, primary content categorization filter 127 includes a category model for a particular category to which an electronic document may be classified. The category model identifies combinations of features that are statistically significant in an electronic document providing a content relating to that particular category. Pattern recognition may be utilized to create one or more category models. For example, a particular category model may be created to identify combinations of statistically significant features of an electronic document providing a content relating to sex education, mature content, pornography, gambling, hate speech, alcohol, drugs, tobacco, bomb-making, weapons, a combination thereof, and so on.

Pattern recognition may create a particular category model by using text classification or other techniques to recognize combinations of statistically significant features (e.g., statistically significant keywords, key phrases, and/or contextual information). Electronic documents providing a content relating to a particular category often include some features that are commonly shared among such electronic documents. A category model trained by pattern recognition may be able to identify combinations of statistically significant features that may not be identified by keyword matching techniques. In particular, the statistical techniques used by pattern recognition to create a category model may generalize features based on training samples such that the category model may be able to recognize variations of a given feature. For example, the category model may be able to recognize a slangy phrase such as "n@sty" as relating to a category of mature content. In contrast, the keyword matching techniques employed by known systems and methods may not be able to effectively recognize such a slangy phrase or other phrase variations. Nonetheless, it is contemplated by the present invention that keyword matching may be utilized contemporaneously with pattern recognition to train primary content categorization filter 127.

Primary content categorization filter 127 may further use other classified documents from a web site to categorize other electronic documents on the same web site. For example, if a web page of a web site includes pornographic contents, then other web pages of the same web site may be categorized as including pornographic contents even though they actually do not include such contents. Moreover, other techniques such as scalable vector models, linear regression techniques may be used in addition or in lieu of pattern recognition to train primary content categorization filter 127.

Based on its analysis of features of a received electronic document, primary content categorization filter 127 may generate a confidence level that the electronic document provides a content relating to a particular category. The confidence level of the electronic document is indicative of a likelihood that the electronic document relates to the particular category. In one embodiment, the confidence level of the electronic document is generated based in part on a frequency of one or more features appearing in the electronic document as well as a combination of the features existing in the electronic document. Specifically, a feature that by itself may not be indicative of a particular category may serve as contextual or aggregating information indicating that the electronic document relates to that category. For example, the term "education" alone may not suggest that the electronic document relates to the category of sex education. However, the term "education" in combination with the term "sex" may suggest that the electronic document relates to the category of sex education.

In another embodiment of the invention, a distribution of words within an electronic document may also indicate a particular category. For example, appearances of the words "sex" and "education" in an electronic document, even though not within a sentence, may nonetheless indicate that the electronic document is relating to the category of sex education. Accordingly, a number of factors are utilized to determine a likelihood (i.e., a confidence level) that an electronic document relates to a particular category.

After primary content categorization filter 127 determines a confidence level that a received electronic document belongs to a particular category, index builder 124 labels the electronic document with the determined confidence level and the corresponding category information in the index 126. It is noted that index builder 123 may label a multitude of categories for a particular electronic document. For example, a particular electronic document may be labeled a 70% confidence level of being relating to the category of mature content and a 60% confidence level of being relating to the category of pornography. Index 126 also stores one or more index terms associated with a received electronic document and a network location (e.g., a URL) where the received electronic document may be found on network 106.

Figure 2:
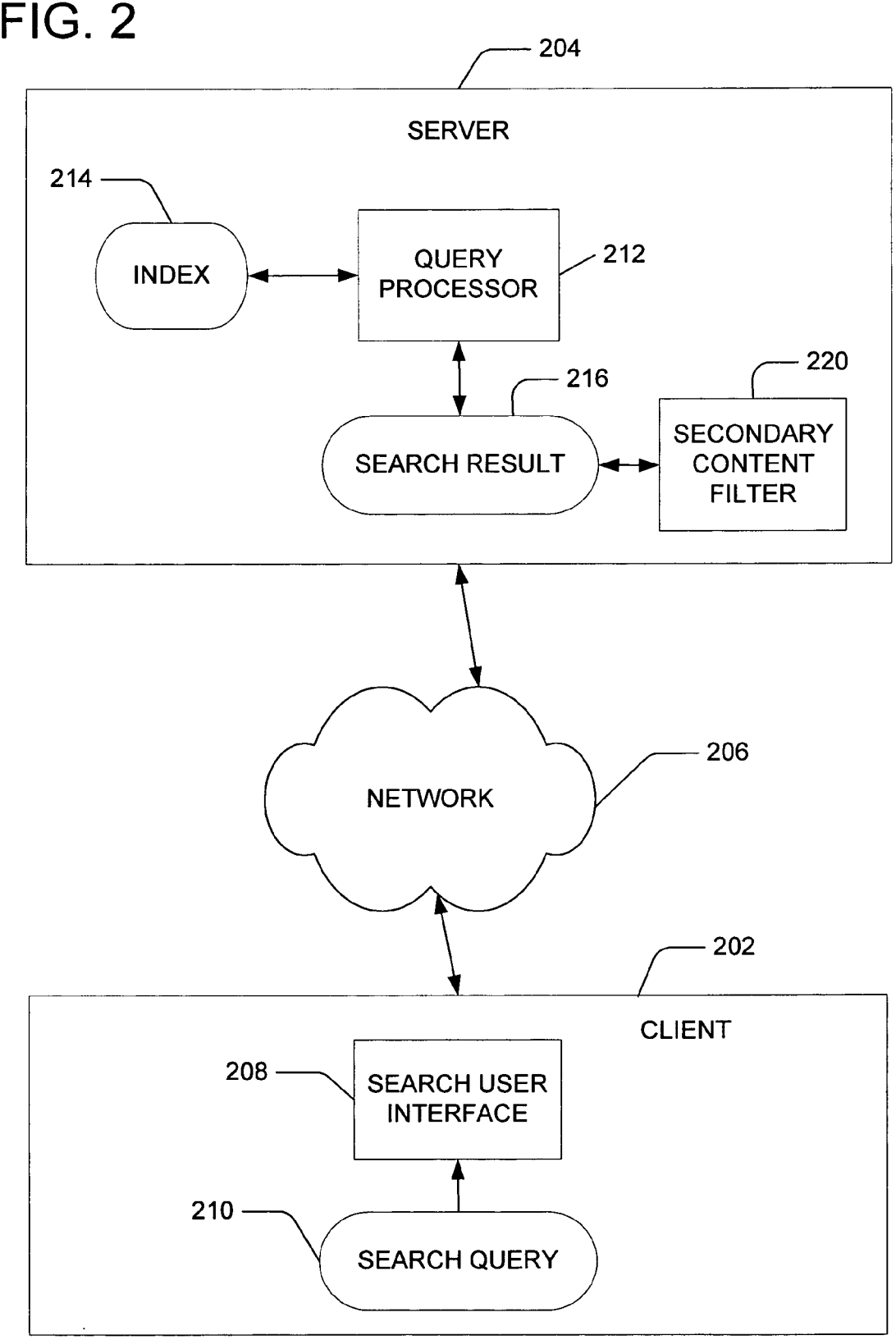
FIG. 2 is a block diagram illustrating another exemplary network environment in which embodiments of the present invention may be utilized with secondary content filtering at a server.

Referring next to FIG. 2, a block diagram illustrates another example of a suitable network environment in which embodiments of the invention may be utilized. A client computer 202 is connected to a server computer 204 by a network 206. Again, the network 206 may be a local area network (e.g., an intranet), a wide area network (e.g., the Internet), or a combination of networks. Network 206 may be the same as network 106 of FIG. 1 or a different network. The client computer 202 includes a search user interface 208 (e.g., a browser) or other machine-accessible programming interface or protocol that locates and displays electronic documents to a user.

When a user of client computer 202 desires to search for one or more electronic documents, he or she submits a search query 210 to the search user interface 208. After the user submits the search query 210, client computer 202 transmits search query 210 to a query processor 212 of the server computer 204 to request a search. The query processor 212 is configured to translate the syntax of search query 210 into a format of index terms encoded in an index 214 of server computer 204. Query processor 212 then examines the index 214 to detect a stored index term that corresponds to the search term decomposed from search query 210. If query processor 212 detects a corresponding index term stored in index 214, it finds a list of network locations stored in index 214 that are associated with this index term. That is, query processor 212 obtains from index 214 a list of network locations where electronic documents that have data corresponding to this stored index term are located. Query processor 212 then generates a search result 216. The search result 216 specifies one or more electronic documents determined by query processor 212 as having data corresponding to search query 210. Moreover, search result 216 includes presentation data regarding with the specified electronic documents. Each presentation data includes one or more format attributes such as title, description, URL, color, font, and other textual, audio, video, or image data.

In one embodiment of the invention, when query processor 212 generates search result 216, it examines index 214 to determine the classification of an electronic document initially determined as having data corresponding to search query 210. Based on the classification of the electronic document, query processor 212 may exclude the electronic document from search result 216 if the classification indicates that the electronic document provides an undesirable content. For example, depending on a default setting, query processor 212 may exclude from search result 216 an electronic document with a greater than 70% confidence level of being relating to one or more of the following categories: sex education, mature content, pornography, gambling, hate speech, alcohol, drugs, tobacco, bomb-making, weapons, a combination thereof, and so on.

The user may also specify a preference with regard to what types of contents should be excluded from search result 216. For instance, the user may via search query to via a setting of client computer 202 specify that contents relating to mature content and pornography should be excluded from search result 216 but contents relating to sex education should not be excluded. Query processor 212 thus generates search result 216 according to a default setting or a user-specified preference, and search result 216 is exclusive of electronic documents that are deemed undesirable based on their classifications. The user-specified preference may further be applied to primary content categorization filter to filter electronic documents.

Because of the possible error rate of primary content categorization filter 127 in categorizing electronic documents and the large number of electronic documents located on the network, primary content categorization filter 127 may fail to accurately classify some of the collected electronic documents. Accordingly, a secondary content filter 220 located on server computer 204 provides a presentation-level content filtering for search result 216. Similar to primary content categorization filter 127, the secondary content filter 220 may be trained by pattern recognition or other techniques (e.g., keyword or key phrase matching, statistical analysis, scalable vector models, linear regression techniques, etc.) to determine a logic as to what features constitute an undesirable content. The logic of secondary content filter 220 thus includes one or more features that are statistically significant in an undesirable content and may include variations of a given feature (e.g., the term "n@sty" as a variation of the term "nasty").

Secondary content filter 220 is configured to identify or detect a plurality of undesirable contents that may exist in an electronic document or in presentation data regarding the electronic document. Such undesirable contents may be included in textual data, audio data, video data, or image data of the electronic document or presentation data. For example, the logic of secondary content filter 220 may specify that terms such as "sex," "porn," "weapon," or "hate" are undesirable, whether they appear in textual data, audio data, video data, or image data. In another example, the logic may specify that images or video clips of nude individuals are undesirable. In one embodiment of the invention, the logic of secondary content filter 220 is user configurable. That is, the user may specify via search query 210 or a setting of client computer 202 a type of content that the user desires to be filtered by secondary content filter 220. Otherwise, a default setting of secondary content filter 220 will be applied to filter contents of search result 216.

Based on a default setting or a user-configurable preference, secondary content filter 220 parses presentation data included in search result 216 to detect an undesirable content. As discussed, the presentation data may include textual data, audio data, video data, and/or image data, and secondary content filter 220 is configured to detect if each of these types of data include an undesirable content. For example, search result 216 may provide a thumbnail image that allows the user to preview a particular electronic document. That is, the thumbnail image allows the user to see a content of the electronic document before he or she navigates to the electronic document from search result 216. In this case, secondary content filter 220 may parse the thumbnail image to detect if the image includes one or more undesirable contents as specified by the logic of secondary content filter 220.

If secondary content filter 220 detects an undesirable content in the presentation data, it proceeds to modify or vary search result 216 to avoid presenting the undesirable content to the user. In one embodiment of the invention, secondary content filter 220 modifies search result 216 by altering a format attribute of the presentation data detected to include the undesirable content. For example, if the term "sex" is considered an undesirable content, secondary content filter 220 may substitute this term with some obscuring or replacement text such as XXXXXX or ###### to block out this term from the presentation data. In another example, a partial text (e.g., "adult sf pictures") or a graphic may be used to obscure the undesirable content. Moreover, if audio data, video data, or image data of the presentation data includes a detected undesirable content, secondary content filter 220 may replace such data with a warning audio clip, video clip, or graphic to protect the user from the undesirable content. Thus, secondary content filter 220 may replace a graphical thumbnail preview of a potentially undesirable content with a warning graphic in search result 216**.

In an alternative embodiment of the invention, if secondary content filter 220 has a certain degree of confidence (e.g., more than 70%) that an electronic document included in search result 216 provides an undesirable content, then it may modify a format attribute by excluding the electronic document and presentation data regarding the electronic document from search result 216. For instance, if secondary content filter 220 determines that more than 70% of presentation data regarding a particular electronic document are undesirable, then it may filter out that particular electronic document and the associated presentation data from search result 216. Thus, search result 216 will not direct the user to an electronic document determined by secondary content filter 220 as possibly having an undesirable content.

Secondary content filter 220 may also include a notice in search result 216 to alarm the user that search result 216 possibly includes an undesirable or otherwise objectionable content. For example, secondary content filter 220 may highlight presentation data in search result 216 detected to have an undesirable content. Moreover, secondary content filter 220 may incorporate a warning font, background shading color (e.g., red), or adjacent icon (e.g., an exclamation mark) in the presentation data to alarm the user that an electronic document associated with the presentation data possibly provides an undesirable content.

According to one embodiment of the invention, secondary content filter 220 modifies search result 216 (e.g., modifying a format attribute of presentation data) based on a locality, language, or market of the user such that the user would understand the meaning of such a modification or variation. Thus, if secondary content filter 220 determines that the user resides in Japan, speaks Japanese, or is generally involved in the Japanese market, it will use yellow color to modify search result 216 instead of red color because yellow is considered to suggest offensive materials in Japan. Similarly, secondary content filter 220 may use Japanese characters as replacement or obscuring texts to block undesirable contents.

After secondary content filter 220 modifies a format attribute to avoid presenting an undesirable content to the user or to exclude undesirable presentation data from search result 216, query processor serves the modified or varied search result 216 to search user interface 208 as "hits" of search query 210. The user of client computer 202 may then examine search result 216 and navigate to one or more desired electronic documents located at remote computers from search result 216. By filtering out undesirable contents in search result 216, secondary content filter 220 prevents the user from viewing a potentially offensive material in search result 216. When the user selects a particular electronic document on search result 216 and navigates to that electronic document from search result 216, secondary content filter 220, which may be implemented in a client computer of the user, performs similar actions to avoid presenting an undesirable content of the electronic document to the user. Specifically, when the user navigates to an electronic document from search result 216, secondary content filter 220 parses and analyzes the electronic document to identify or detect an undesirable content as defined by the logic of secondary content filter 220. If secondary content filter 220 identifies or detects an undesirable content in the electronic document, it then modifies the electronic document to avoid presenting the undesirable content to the user. For instance, secondary content filter 220 may replace the term "sex" with some obscuring text or graphics if the logic specifies that this term is undesirable. Moreover, secondary content filter 220 may include a notice in the electronic document to warn the user that this electronic document provides an undesirable content. In one embodiment of the invention, secondary content filter 220 modifies an electronic document based on a locality, language, or market of the user.

It is noted that the logic of secondary content filter 220 includes one or more exceptions as to what is considered an undesirable content. As discussed, the logic may include a list of terms that are determined to be undesirable. This list of terms may be language and market-culture specific. When one or more of these terms appear in search result 216, secondary content filter 220 blocks or alters the term to avoid presenting this term to the user. The logic also includes exceptions to the rule that secondary content filter 220 would block or alter a term determined to be undesirable. Such exceptions may be based on a default setting, a user-configurable preference, or search query 210. For example, the default setting may specify that secondary content filter 220 should block or alter instances of the term "sex" appearing either in search result 216 or in an electronic document. But a user preference may specify that the user desires to filter out contents relating to pornography but not sex education. Alternatively, the user may specify the search term "sex education" in search query 210. In such scenarios, the logic of secondary content filter 220 may include an exception such that secondary content filter 220 would not filter the term "sex" when this term immediately precedes the term "education," even though the term "sex" is considered undesirable in other scenarios. Accordingly, appearances of the terms "sex" and "education" together may become an exception to the rule that instances of the term "sex" would be filtered by secondary content filter 220.

Embodiments of the invention also support system-wide white/black override lists. For example, when a certain term has been determined to be undesirable but is not properly filtered out by secondary content filter 220, this term is added to the system-wide black override list so it will be filtered out by secondary content filter 220 in the future. Similarly, if secondary content filter 220 filters a term that is not undesirable, this term may be added to the system-wide white override list so that secondary content filter 220 will not filter out this term in the future.

After secondary content filter 220 modifies search result 216 (e.g., altering a format attribute) or varies an electronic document selected by the user in search result 216, an embodiment of the invention provides a feedback mechanism to improve the efficiency and accuracy of primary content categorization filter 127 and/or secondary content filter 220. In particular, secondary content filter 220 may inform primary content categorization filter 127 that a particular electronic document and/or presentation data regarding the electronic document provides an undesirable content. That is, secondary content filter 220 may communicate to primary content categorization filter 127 the fact that primary content categorization filter 127 did not effectively or accurately classify an electronic document having an undesirable content. Thus, primary content categorization filter 127 may use this feedback to learn from its mistake to provide a more accurate classification for the electronic document in the future. For example, after primary content categorization filter 127 learns from secondary content filter 220 that an electronic document or presentation data regarding the electronic document provides an undesirable content, it may properly classify this electronic document based on the detected undesirable content. Therefore, depending on a default setting or user preference, query processor 212 may effectively exclude this electronic document from a subsequent search result. Furthermore, primary content categorization filter 127 may use the feedback provided by secondary content filter 220 as training data to improve its learning efficiency and accuracy. Primary content categorization filter 127 may thus improve classification and categorization of other collected electronic documents as well.

Secondary content filter 220 is also configured to loop back the detection of an undesirable content to improve its own efficiency and accuracy in detecting undesirable contents of presentation data and electronic documents. Specifically, previously detected undesirable contents may be fed back to secondary content filter 220 such that secondary content filter 220 may learn to improve its identification and detection of other undesirable contents included in presentation data or in an electronic document.

Embodiments of the invention may also accommodate data from explicit user feedback mechanisms in the search result user interface (UI) or client (e.g., toolbar, browser) UI that would further feed the feedback mechanism. For example, if there is a "report this result as adult content" button/link in the search result UI or client UI and if the user clicks on this button/link both primary content categorization filter 127 and secondary content filter 220 may use this "positive" feedback to improve their filtering algorithms. Similarly, if the user clicks on a "unblock this result" button/link, primary content categorization filter 127 and secondary content filter 220 may use this "negative" feedback such that the filtering algorithms will avoid these false positives in the future.

In an embodiment of the invention, primary content categorization filter 127 may be at least partially disabled in the server computer. Thus, It is contemplated that primary content categorization filter 127 is not used to classify collected electronic documents. If primary content categorization filter is completely disabled, query processor 212 will not generate search result 216 based on the classification of an electronic document indexed in index 214. Thus, search result 216 may direct the user to one or more undesirable electronic documents. In this case, secondary content filter 212 becomes the main filter to alter undesirable contents of search result 216 and/or of the electronic documents that search result 216 points to. As may be seen, by disabling primary content categorization filter 127 and conducting the filtering at query time and/or browse time instead of at crawl time, the expensive computational costs associated with offline analyzing and categorizing of electronic documents is offloaded to secondary content filter 220. Since the computational costs associated with presentation-level filtering at query time or browse time is relatively inexpensive compared with the costs associated with offline analyzing and categorizing, embodiments of the invention provide efficient filtering and presentation of a search result. One scenario when partial disablement of primary content categorization filter 127 is desired may include system overload (e.g., breaking news causes query/processing load to spike, or an unrelated system failure causes a small amount of the scaled system to handle a larger-than usual load).

In general, primary content categorization filter 127 filters electronic documents more thoroughly but more time consuming than secondary filter 220 because primary content categorization filter 127 may parse an entire electronic document while secondary content filter 220 parses presentation data of the electronic document. Thus, the secondary content filter 220 may be less accurate but faster than primary content categorization filter 127. Primary content filter 127 may be temporarily disabled because of throughput issues, instability, etc. But disabling primary content filter 127 partially or completely may result in a proportional cost to accuracy.

In an alternative embodiment of the invention, primary content categorization filter 127 may selectively classify collected electronic documents. In particular, primary content categorization filter 127 may disable one or more category models and utilize a selective category model to classify collected electronic documents. For example, the filtering process may be tweaked so that primary content categorization filter 127 performs 90% of the categorization to achieve partial filtering accuracy. And secondary content filter 220 may perform the rest 10% of the filtering to provide an effectively filtered search result. Thus, if a default setting or user preference specifies 20 categories of electronic documents that are undesirable, primary content categorization filter 127 may turn off one or more of such categories such that it may not effectively classify electronic documents corresponding to the turned-off categories. Secondary content filter 220 may then be utilized to perform a presentation-level filtering such that presentation data regarding these unfiltered electronic documents are altered. In addition, secondary content filter 220 may modify these electronic documents when the user navigates to them from the search result.

Figure 3:
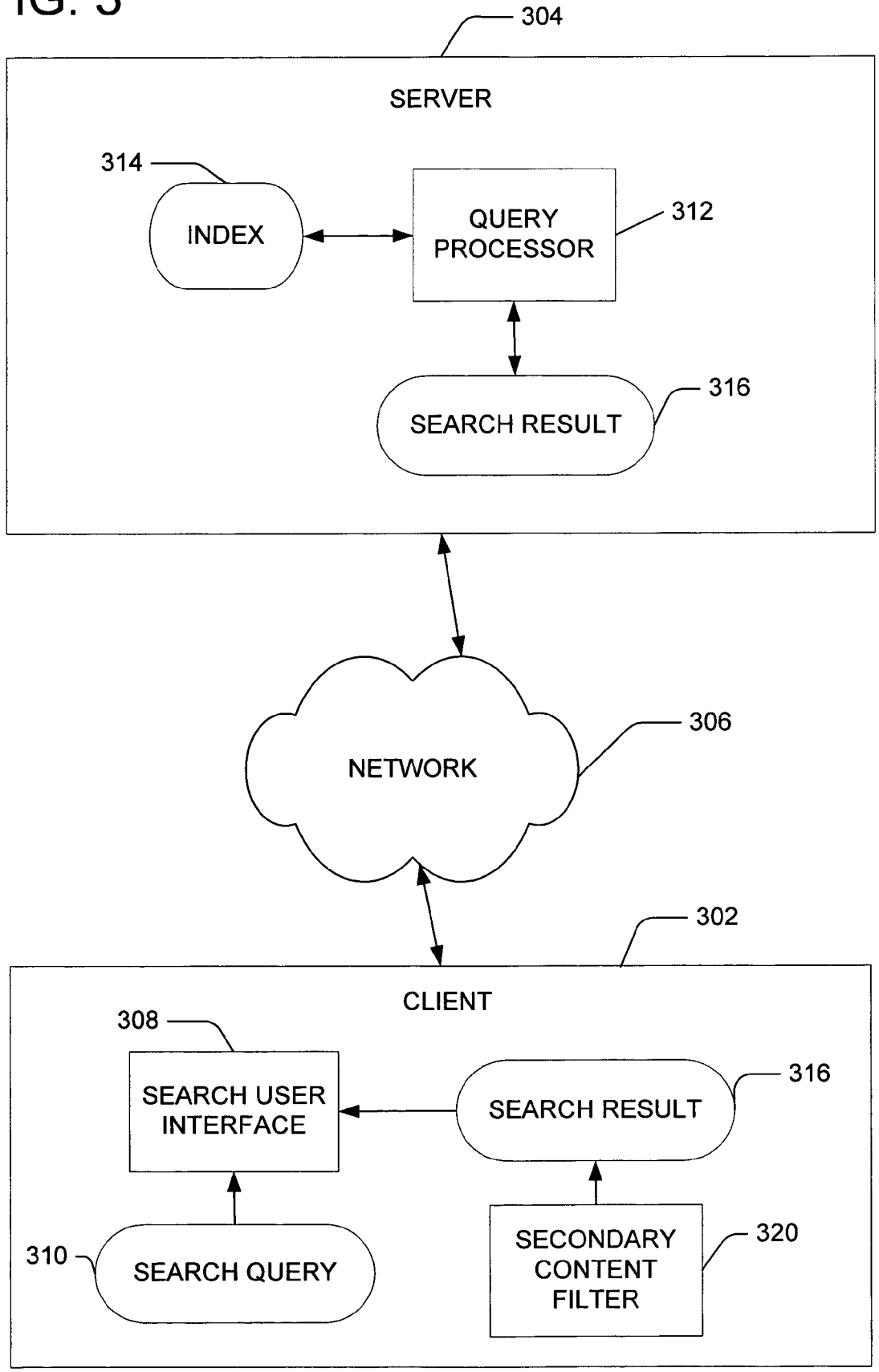
FIG. 3 is a block diagram illustrating yet another exemplary network environment in which embodiments of the present invention may be utilized with secondary content filtering at a client.

Referring now to FIG. 3, a block diagram illustrates yet another example of a suitable network environment in which embodiments of the invention may be utilized. FIG. 3 illustrates an exemplary client-based system, in which a secondary content filter is implemented in a client computer presenting a search result instead of in a server computer serving the search result. As illustrated, a client computer 302 is connected to a server computer 304 by a network 306. The client computer 302 includes a search user interface 308 (e.g., a browser) or other machine-accessible programming interface or protocol that locates and displays electronic documents to a user. Via the search user interface 308, a user of client computer 302 submits a search query 310 to a query processor 312 of the server computer 304 to request a search. The query processor 312 examines an index 314 to find a list of electronic documents based on the search query 310. Query processor 312 then generates a search result 316. In one embodiment of the invention, query processor 312 generates the search result 316 based on classifications of one or more electronic documents indexed in the index 314. That is, query processor 312 excludes an electronic document from search result 316 if the electronic document is classified as providing an undesirable content.

In contrast to the network environment illustrated in FIG. 2, a secondary content filter 320 is located on client computer 302 instead of on a server computer to provide a presentation-level filtering of search result 316. The secondary content filter 320 parses and analyzes presentation data of search result 316 and modifies search result 316 to avoid presenting a detected undesirable content of the presentation data to the user or to exclude the presentation data from search result 316. Moreover, when the user navigates to a particular electronic document from search result 316, secondary content filter is configured to analyze a content of the electronic document and to modify the electronic document to avoid presenting an undesirable content to the user. Additionally, secondary content filter 320 may include a notice in an undesirable electronic document and/or undesirable presentation data to warn the user about possible offensive materials.

By implementing secondary content filter 320 in client computer 302 instead of in server computer 304, at least some of the computational costs associated with content filtering are offloaded to client computer 302. Thus, the filtering is conducted at browse time when search user interface 308 (e.g., a browser) renders search result 316 instead of at query time when query processor 312 generates search result 316. If primary content categorization filter 127 is disabled in the server computer, then client computer 302 may bear most of the processing relating to content filtering of search result 316.

According to an embodiment of the invention, the system illustrated in FIGS. 1-3 generates reporting data for internal review so that system operators may see how much blocking primary content categorization filter 127 and/or secondary content filter 220 are doing (e.g., what percentage of queries, what percentage of search results, what percentage of presentation data, etc), how much data is being fed back to the feedback mechanism, etc.

It is appreciated that the systems illustrated in FIGS. 1, 2, and 3 are exemplary, and alternative configurations may be used in accordance with embodiments of the invention. For example, crawler 104, index builder 124, and/or query processor 212/312 may reside on the same computer or different computers. Also, Crawler 104, index builder 124, and/or query processor 212/312 may be part of the same search engine or of different search engines. Primary content categorization filter 127 and secondary content filter 220 may similarly reside on a single server computer or on different server computers. Additionally, search user interface 208/308 and crawler 104 may reside on a single computer or different computers. As discussed above, client computers 202 and 302, server computers 102, 204, and 304, and remote server computers 108 and 110 may communicate with each other through any type of communications network or communications medium.

Figure 4:
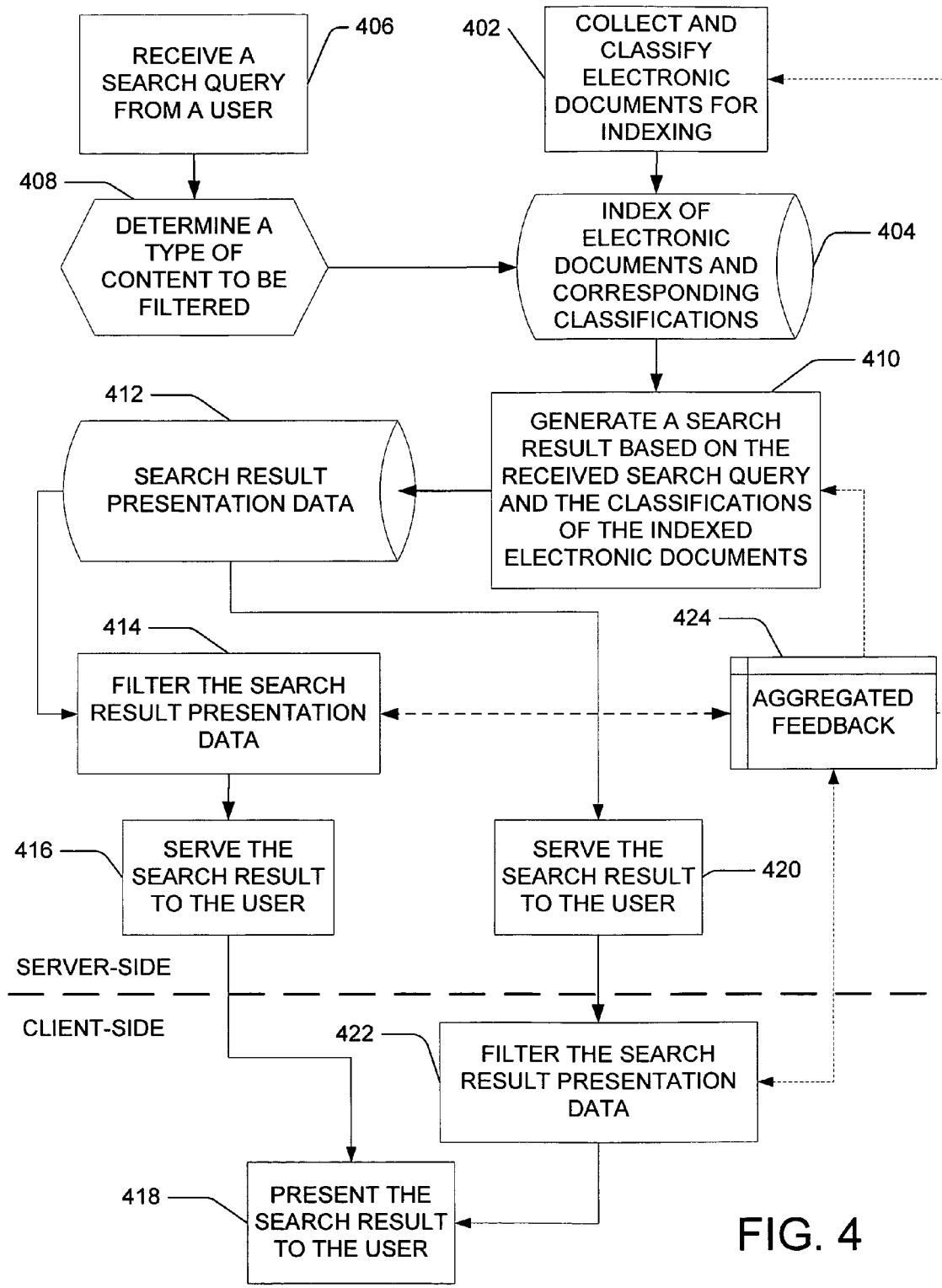
FIG. 4 is an exemplary flow diagram illustrating process flow according to one embodiment of the invention for presenting a search result to a user.

FIG. 4 illustrates an exemplary method for presenting a search result to a user according to one embodiment of the invention. At 402, a plurality of electronic documents are collected (e.g., by a crawler) from a communications network for indexing. During this offline process, the electronic documents are parsed and analyzed to determine their classifications. For example, a primary content categorization filter may determine a label or classification for a collected electronic document according to one or more categories such as sex education, mature content, pornography, gambling, hate speech, alcohol, drugs, tobacco, bomb-making, weapons, a combination thereof, and so on. One or more of these categories may be turned off such that some collected electronic documents may not be effectively classified or labeled. At 404, the collected electronic documents and their corresponding classifications are indexed in a memory area.

At 406, a search query is received from a user. At 408, a type of content to be filtered is determined. Such a determination may be made according to a default setting, a specified preference of the user, and/or the received search query. Moreover, it may be determined that content filtering will not be applied for the search request represented by the received search query. At 410, a search result is generated (e.g., by a query processor) based on the received search query and the classifications of the electronic documents indexed in the memory area. Particularly, an index of electronic documents is examined to identify one or more electronic documents that correspond to the search query received from the user. Moreover, based on the classifications of the identified electronic documents, it is determined if one or more of these electronic documents are undesirable. For example, if the classification of a particular electronic document corresponds to a type of content desired to be filtered, then the electronic document is undesirable in a search result. Accordingly, such an undesirable electronic document is excluded from the generated search result.

At 412, presentation data regarding an electronic document included in the generated search result is generated. The presentation data may include format attributes such as a title, description, and/or URL of the electronic document. Furthermore, the format attributes of the presentation data may include various types of data such as audio data, video data, image data, and textual data. For instance, the presentation data may include a thumbnail image that provides a preview of a content of the electronic document. Therefore, the user has a greater understanding of the electronic document even before he or she navigates to the electronic document from the search result page.

At 414, the presentation data included in the search result is filtered at the server-side. That is, the presentation data is filtered before the search result is served to a client computer of the user. In one embodiment of the invention, the presentation data is parsed and analyzed to identify an undesirable content. Again, the undesirable content may be based on the type of content desired to be filtered as determined at 408. If an undesirable content (e.g., an offensive language) is identified, then the presentation data is altered in the search result (e.g., modifying or varying a format attribute) to avoid presenting the undesirable content to the user. For example, an obscuring text, image, video clip, or other types of data may be used to replace the undesirable content. Alternatively, the presentation data and the corresponding electronic document may be excluded from the search result at 414. In another embodiment of the invention, a notice may be included in the presentation data to warn the user that the electronic document associated with the presentation data may be undesirable. For example, a special icon may be included in the presentation data to alarm the user, the presentation data may be highlighted, a background color may be changed, and/or a font of the presentation data may be varied. Moreover, the way that the presentation data is altered or the way that the notice is included may be dependent on a locality, language, or market of the user.

After the presentation data is filtered, the modified or varied search result is served to the user at 416, and the search result is presented to the user at the client-side at 418. In one embodiment of the invention, the search result is presented to the user by a search user interface (e.g., a browser) of a client computer.

Instead of or in addition to filtering the presentation data before the search result is served to the user, the search result may be served to the user at 420, and then the presentation data may be filtered at the client-side at 422. Accordingly, a secondary content filter implemented in a client computer of the user will be responsible for filtering the presentation data after the search result is served to the client computer. After the presentation data is filtered at 422, the modified search result is presented to the user at 418. Moreover, when the user navigates to a particular electronic document from the search result, this electronic document is parsed and analyzed to determine if an undesirable content exists in the electronic document. If an undesirable content is detected, then the electronic document is modified before it is presented to the user to avoid the user from viewing the undesirable content.

According to one embodiment of the invention, after the presentation data if filtered either at the server-side or at the client-side, information regarding such a filtering is aggregated at 424. Thus, if a particular electronic document and/or presentation data regarding the electronic document is detected to include an undesirable content, then this information is aggregated at 424. Such aggregated information is then provided to a secondary content filter (e.g., implemented on the server-side or on the client-side) that filters the presentation data. The secondary content filter may accordingly use this information as a feedback to improve its accuracy and efficiency in detecting undesirable contents. For example, when the secondary content filter identifies this particular electronic document in a subsequent search result, it may automatically exclude presentation data regarding this electronic document from the search result or automatically modify the presentation data without analyzing or parsing the presentation data. Similarly, the secondary content filter may automatically deny the user access to this electronic document or automatically modify the electronic document to avoid presentation of an undesirable content.

In addition, the information aggregated at 424 may be communicated to a primary content categorization filter that classifies the collected electronic documents for indexing. Therefore, if an electronic document is identified as having an undesirable content or is identified as having undesirable presentation data, it may mean that the primary content categorization filter failed to accurately classify this electronic document so that the electronic document is excluded from the initial search result. By communicating the aggregated information to the primary content categorization filter as a feedback, the primary content categorization filter may correct its classification of a particular electronic document. Moreover, the primary content categorization filter may use a detected undesirable content and a proper classification of an electronic document as training data to improve its classification efficiency and accuracy. So the aggregated information provides a learning mechanism for the primary content categorization filter to efficiently and accurately classify other electronic documents collected from a communications network.

Figure 5:
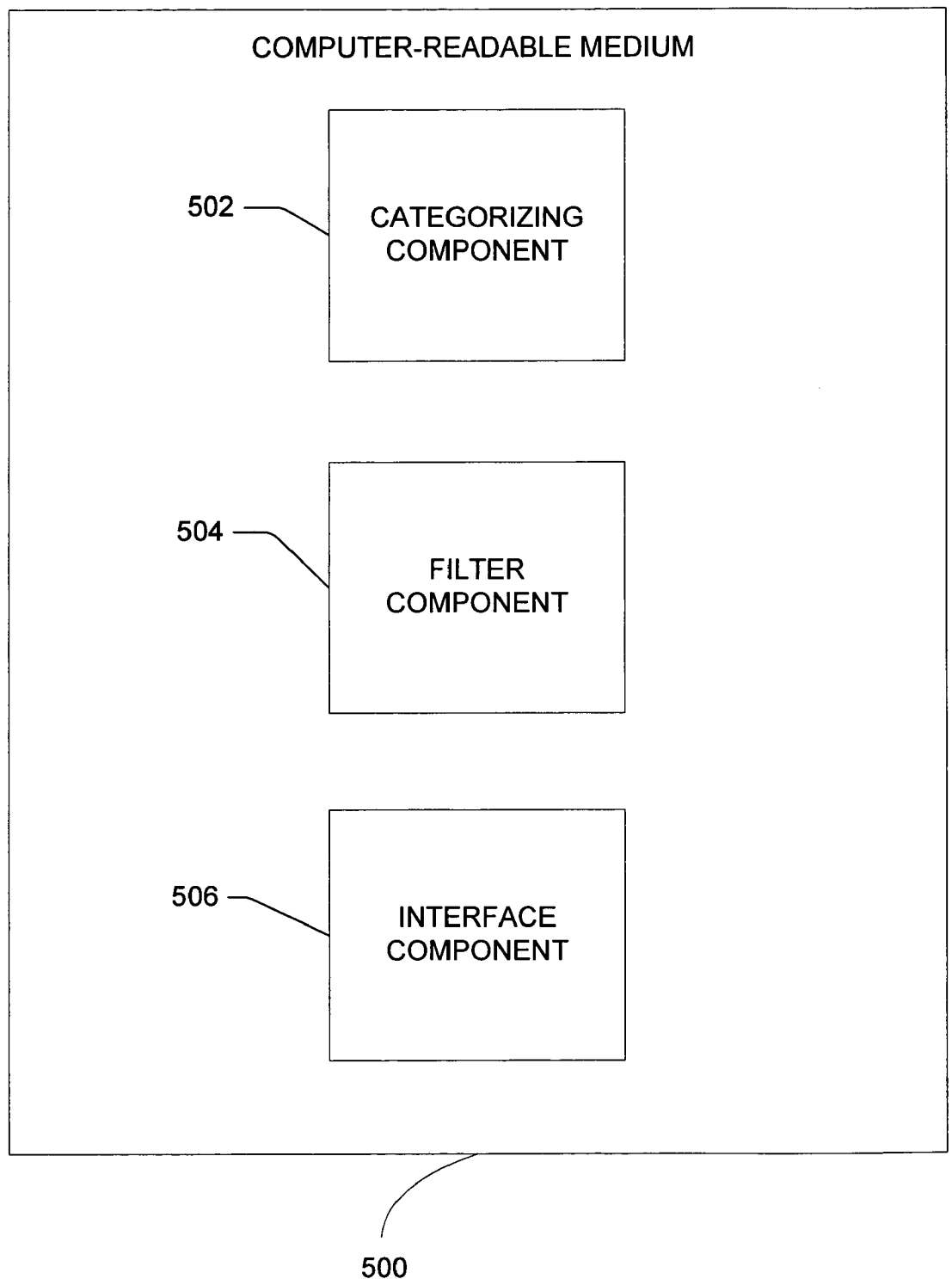
FIG. 5 is a block diagram illustrating an exemplary computer-readable medium according to one embodiment of the invention.

FIG. 5 is a block diagram illustrating an exemplary computer-readable medium 500 according to one embodiment of the invention. As shown, the computer-readable medium 500 includes a categorizing component 502, a filter component 504, and an interface component 506. However, it is contemplated that computer-readable medium 500 may be any quantity of computer readable media and may comprise various combinations of components and functionalities associated with each component.

The categorizing component 502 is configured to classify a plurality of electronic documents and label the electronic documents in an index. In response to a search query received from a user, a search result is produced based on the classifications or labels of the indexed electronic documents. The filter component 504 detects an undesirable content of presentation data included in the produced search result. Filter component 504 then varies a format attribute of the presentation data of the identified undesirable content. For example, filter component 504 may vary the produced search result to avoid presenting the detected undesirable content to the user or to exclude the presentation data from the search result. The interface component 506 then provides the varied search result to the user.

Additionally, filter component 504 communicates the detected undesirable content to categorizing component 502 to improve classification of electronic documents collected from a communications network. Based on the detected undesirable content, filter component 504 is further configured to improve its detection of other undesirable contents of an electronic document or presentation data regarding the electronic document In one embodiment of the invention, filter component 504 may include a notice in the presentation data to indicate that one or more electronic documents that the search result points to may be undesirable. In another embodiment of the invention, filter component 504 is configured to detect an undesirable content of the presentation data or an undesirable content of a particular electronic document as a function of a default setting, user preference, and/or search query. Moreover, filter component 504 is configured to vary the search result in accordance with the user's locality, language, and/or market. According to an embodiment of the invention, filter component 504 is configured to detect an undesirable content of an electronic document and to modify the electronic document to avoid presenting the detected undesirable content of the electronic document to the user. And interface component 506 is configured to provide the modified electronic document to the user in response to the user selecting the electronic document in the provided search result or navigating to the electronic document from the provided search result.

Figure 6:
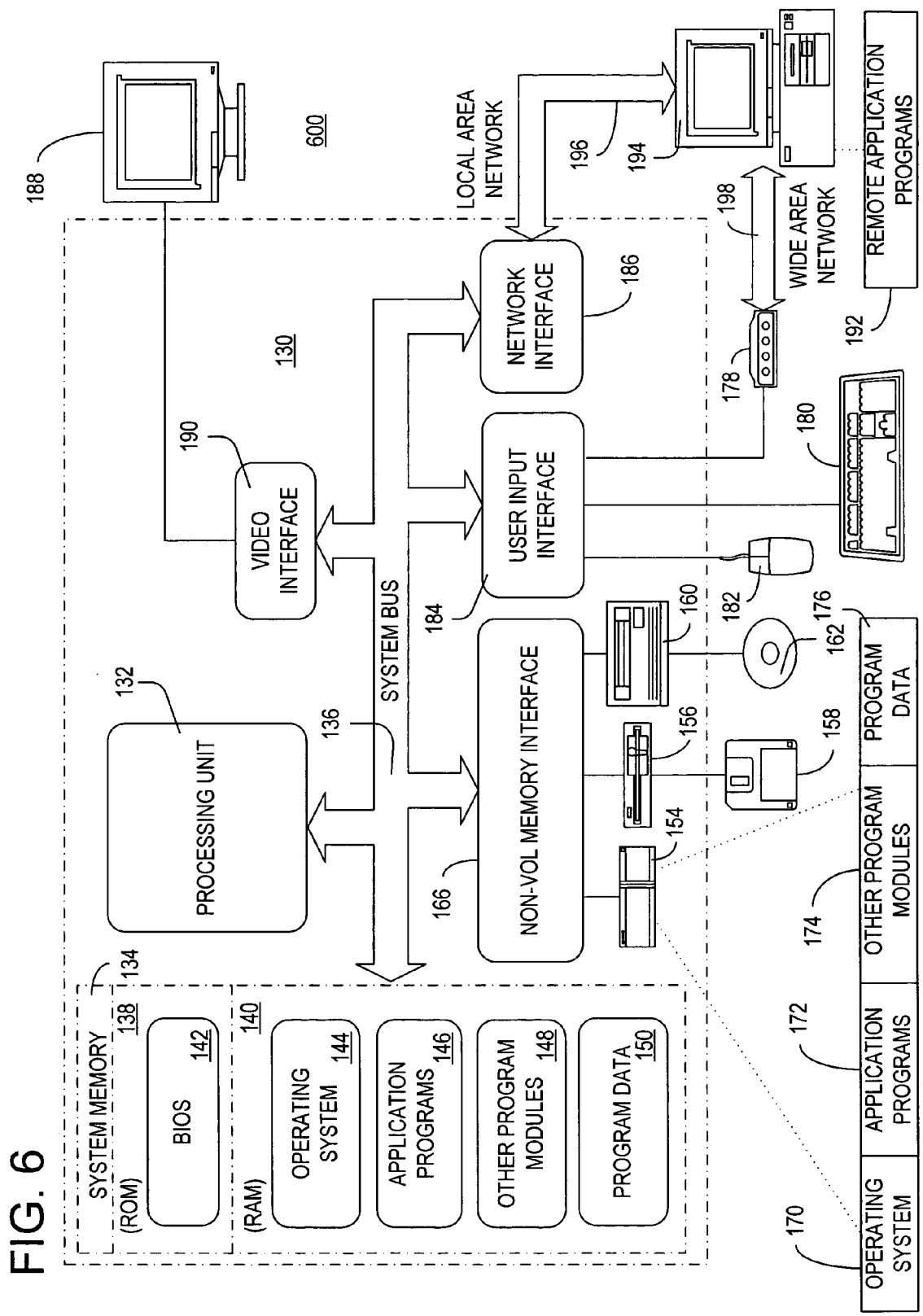
FIG. 6 is a block diagram illustrating an exemplary embodiment of a suitable computing system environment in which one embodiment of the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/ output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

In operation, computer 130 executes computer-executable instructions such as those described herein to present a search result to a user. One or more electronic documents are identified based on a search query received from a user. A search result is generated in response to identifying the one or more electronic documents. The search result includes presentation data regarding each of the identified electronic documents. Computer-executable instructions are configured to identify an undesirable content of each of the presentation data of each of the identified electronic documents of the search result. Computer-executable instructions are also configured to modify a format attribute of the presentation data of the identified undesirable content. Computer-executable instructions are further configured to provide the search result including any modifications to the user.

Computer 130 also executes computer-executable instructions such as those described herein to present a search result to a user. A search query is received from a user. Each of a plurality of electronic documents has been classified based on one or more categories. Computer-executable instructions are configured to identify an undesirable electronic document from the plurality of electronic documents in response to the received search query. The undesirable electronic document is identified based on a classification of each of the plurality of electronic documents. Computer-executable instructions are configured to generate a search result. The search result excludes the identified undesirable electronic document. Computer-executable instructions are also configured to identify an undesirable content of each presentation data of each electronic document included in the search result. Computer-executable instructions are further configured to vary a format attribute of the presentation data of the identified undesirable content. Computer-executable instructions are configured to provide the search result including any variations to the user.

The following provides a specific example of user scenario according to embodiments of the invention. A user queries a search engine for the term "amateur video." The search engine returns a search result, which includes an unintended adult-oriented content. Particularly, offensive languages appear in result descriptions of web sites 1, 5, and 8 on the search result page. Such offensive languages are replaced with the obscuring text "XXXXXX" to prevent the user from seeing the offensive languages. The user then visits web site 3 because the presentation data of the search result indicates that web site 3 does not provide an undesirable content. But in fact, web site 3 does provide offensive materials. Accordingly, offensive languages in web site 3 are altered to prevent the user from seeing the offensive languages when he or she visits web site 3. The findings that web sites 1, 5, and 8 include undesirable result descriptions and that web site 3 provides offensive materials on its actual web page are reported to a primary content categorization filter and a secondary content filter. Such findings are analyzed in aggregate such that a user who does the same query will be provided a search result that excludes web sites 1, 3, 5, and 8 as well as other undesirable contents.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A method of presenting a search result to a user, said method comprising:
   identifying, prior to receiving a search query from the user, an undesirable content in one or more of a plurality of electronic documents;
   modifying, prior to receiving the search query from the user, each of the electronic documents having the identified undesirable content to alter the identified undesirable content;
   receiving the search query from the user;
   identifying one or more of the plurality of electronic documents based on the received search query;
   generating a search result in response to the identified electronic documents, said search result including presentation data regarding each of the identified electronic documents;
   identifying an undesirable content in the presentation data of one or more of the identified electronic documents of the search result;
   modifying a format attribute of the presentation data of the identified undesirable content to prevent display of the identified undesirable content,
      wherein modifying the format attribute comprises modifying the format attribute in accordance with one or more of the following: a language of the user and a locality of the user; and
   providing the search result including the modified format attribute to prevent display of the undesirable content to the user.

2. The method of claim 1, wherein modifying the format attribute comprises modifying the format attribute at one or more of the following: a server computer serving the search result to the user and a client computer presenting the search result to the user.

3. The method of claim 1, further comprising communicating the identified undesirable content to a content categorization filter to improve classification of the identified electronic documents.

4. The method of claim 1, further comprising improving identification of other undesirable contents of the presentation data having the identified undesirable content based on the identified undesirable content.

5. The method of claim 1, wherein modifying the format attribute comprises including a notice in the presentation data having the identified undesirable content to indicate that one or more of the identified electronic documents may be undesirable.

6. The method of claim 1, wherein including the notice in the presentation data having the identified undesirable content comprises one or more of the following: highlighting the presentation data having the identified undesirable content, varying a font of the presentation data having the identified undesirable content, changing a background color of the presentation data having the identified undesirable content, and including an icon in the presentation data having the identified undesirable content.

7. The method of claim 1, further comprising:
receiving, from the user, a selection of the one or more identified electronic documents from the provided search result;
and
providing, to the user, the electronic documents corresponding to the received selection including any modifications to alter the identified undesirable content included therein.

8. The method of claim 1, wherein identifying the undesirable content of each of the presentation data comprises identifying the undesirable content in one or more of the following types of data in each of the presentation data: textual data, audio data, video data, and image data; and wherein modifying the format attribute comprises altering one or more of the following: the textual data, the audio data, the video data, and the image data.

9. The method of claim 1, wherein identifying the undesirable content of each of the presentation data comprises identifying the undesirable content in accordance with one or more of the following: a preference of the user, a default setting, and the received search query.

10. The method of claim 1, wherein one or more computer storage media have computer-executable instructions for performing the method recited in claim 1, and further comprising executing said computer-executable instructions to perform said identifying the undesirable content in the electronic documents, said modifying each of the electronic documents, said receiving, said identifying the electronic documents, said generating, said identifying the undesirable content in the presentation data, said modifying the format attribute, and said providing the search result.

11. A method of presenting a search result to a user, wherein a search query is received from a user, and wherein each of a plurality of electronic documents has been classified based on one or more categories prior to receiving the search query, said method comprising:
identifying, prior to receiving the search query, an undesirable electronic document from the plurality of electronic documents, said undesirable electronic document being identified based on a classification of each of the plurality of electronic documents;
receiving the search query from the user;
generating a search result in response to the received search query, said search result including one or more of the plurality of electronic documents and excluding the previously identified undesirable electronic document;
identifying an undesirable content in the presentation data of one or more of the electronic documents included in the search result;
varying a format attribute of the presentation data of the identified undesirable content to prevent display of the identified undesirable content,
wherein varying the format attribute comprises varying the format attribute in accordance with one or more of the following: a language of the user and a locality of the user; and
providing the search result including the varied format attribute to prevent display of the undesirable content to the user.

12. The method of claim 11, wherein identifying the undesirable electronic document comprises identifying the undesirable electronic document at a primary content categorization filter, and wherein varying the format attribute comprises varying the format attribute at a secondary content filter.

13. The method of claim 12, further comprising performing one or more of the following in response to varying the format attribute: communicating the identified undesirable content to the primary content categorization filter to improve classification of the plurality of electronic documents and communicating the identified undesirable content to the secondary content filter to improve identification of other undesirable contents of the presentation data having the identified undesirable content.

14. The method of claim 11, wherein identifying the undesirable content comprises identifying the undesirable content in accordance with one or more of the following: a preference of the user, a default setting, and the received search query.

15. The method of claim 11, wherein varying the format attribute comprises including a notice in the presentation data having the undesirable content to indicate that the electronic document included in the search result may be undesirable.

16. The method of claim 11, wherein identifying the undesirable content comprises identifying the undesirable content in one or more of the following types data in each presentation data: textual data, audio data, video data, and image data; and wherein varying the format attribute comprises altering one or more of the following: the textual data, the audio data, the video data, and the image data.

17. The method of claim 11, wherein varying the format attribute comprises performing one or more of the following: altering the presentation data included in the search result and excluding the electronic document from the search result.

18. The method of claim 11, wherein one or more computer storage media have computer-executable instructions for performing the method recited in claim 11, further comprising executing said computer-executable instructions to perform said identifying the undesirable electronic document, said receiving, said generating, said identifying the undesirable content, said varying, and said providing.

19. A system for presenting a search result to a user, said system comprising:
a memory area for storing a first content filter, a second content filter, and an interface; and
a processor configured to execute computer-executable instructions for:
detecting, by the first content filter prior to receiving a search query from a user, an undesirable content in one or more of a plurality of electronic documents;
modifying, by the first content filter prior to receiving the search query from the user, each of the electronic documents having the detected undesirable content to alter the detected undesirable content;
receiving the search query from the user;
identifying one or more of the plurality of electronic documents based on the received search query;

generating a search result in response to the one or more identified electronic documents, said search result including presentation data regarding each of the identified electronic documents;

detecting, by the second content filter stored in the memory area, an undesirable content in the presentation data of one or more of the identified electronic documents of the search result, said second content filter being further configured to modify a format attribute of the presentation data of the identified undesirable content to prevent display of the identified undesirable content, wherein modifying the format attribute comprises modifying the format attribute in accordance with one or more of the following: a language of the user and a locality of the user; and presenting, by the interface stored in the memory area, the search result including the modified format attribute to prevent display of the undesirable content to the user.

20. The system of claim 19, wherein the second content filter is located on one or more of the following: a server computer serving the search result to the user and a client computer presenting the search result to the user.

21. The system of claim 19, wherein the first content filter comprises a content categorization filter to classify the one or more identified electronic documents and to label the one or more identified electronic documents based on a classification of each of the one or more identified electronic documents, wherein the second content filter is configured to perform one or more of the following: communicating the detected undesirable content to the content categorization filter to improve labeling of the one or more identified electronic documents and improving detection of other undesirable contents of the presentation data having the detected undesirable content based on the detected undesirable content.

22. The system of claim 19, wherein the second content filter is configured to include a notice in the presentation data having the detected undesirable content to inform the user that one or more of the identified electronic documents may be undesirable.

23. The system of claim 19, wherein the interface is configured to receive, from the user, a selection of the one or more identified electronic documents from the provided search result, and wherein the interface is further configured to present, to the user, the electronic documents corresponding to the received selection including any modifications to alter the detected undesirable content included therein.

24. The system of claim 19, wherein each of the presentation data comprises one or more of the following: a title of an identified electronic document, a description of an identified electronic document, and a uniform resource locator of an identified electronic document.

25. The system of claim 19, wherein each of the presentation data comprises one or more of the following types of data: textual data, audio data, video data, and image data; wherein the second content filter is configured to detect the undesirable content in the presentation data in one or more of the following: the textual data, the audio data, the video data, and the image data; and wherein the second content filter is further configured to alter one or more of the following in response to detecting the undesirable content in the presentation data: the textual data, the audio data, the video data, and the image data.

26. The system of claim 19, wherein the second content filter is configured to detect the undesirable content of each of the presentation data as a function of one or more of the following: a preference of the user, a default setting, and the received search query.

27. A system for presenting a search result to a user, said system comprising:

a memory area for storing a primary content categorization filter, a query processor, a secondary content filter, and an interface; and a processor configured to execute computer-executable instructions for:

classifying, by the primary content categorization filter stored in the memory area, each of a plurality of electronic documents based on one or more categories;

identifying, by the query processor stored in the memory area, an undesirable electronic document from the plurality of electronic documents based on a classification of each of the plurality of electronic documents prior to receiving a search query from a user, said query processor being further configured to generate a search result in response to the search query received from the user subsequent to said identifying, said search result including one or more of the plurality of electronic documents and excluding the previously identified undesirable electronic document;

detecting, by the secondary content filter stored in the memory area, an undesirable content in the presentation data of one or more of the electronic documents included in the search result, said secondary content filter being further configured to vary a format attribute of the presentation data of the identified undesirable content to prevent display of the identified undesirable content, wherein varying the format attribute comprises varying the format attribute in accordance with one or more of the following: a language of the user and a locality of the user; and presenting, by the interface stored in the memory area, the search result including the varied format attribute to prevent display of the undesirable content to the user.

28. The system of claim 27, wherein the primary content categorization filter is configured to classify each of the plurality of electronic documents based on a selective category of the one or more categories, and wherein the query processor is configured to identify the undesirable electronic document from one or more electronic documents that have been classified by the primary content categorization filter based on the selective category.

29. The system of claim 27, wherein the secondary content filter is configured to perform one or more of the following: improving detection of other undesirable contents of the presentation data having the detected undesirable content based on the detected undesirable content and communicating the detected undesirable content to the primary content categorization filter to improve classification of each of the plurality of electronic documents.

30. The system of claim 27, wherein each presentation data comprises one or more of the following types of data: textual data, audio data, video data, and image data; wherein the secondary content filter is configured to detect the undesirable content in one or more of the following: the textual data, the audio data, the video data, and the image data; and wherein the secondary content filter is further configured to alter one or more of the following in response to detecting the undesirable content: the textual data, the audio data, the video data, and the image data.

31. The system of claim 27, wherein the secondary content filter is configured to include a notice in the presentation data having the detected undesirable content to inform the user that the electronic document included in the search result may be undesirable.

32. The system of claim 27, wherein the secondary content filter is configured to perform one or more of the following: altering the presentation data having the detected undesirable content included in the search result and excluding the electronic document from the generated search result.

33. One or more computer storage media having computer-executable components for presenting a search result to a user, wherein one or more electronic documents are identified based on a search query received from a user and a search result is produced in response to the one or more identified electronic documents, said search result including presentation data regarding each of the identified electronic documents, said computer storage media comprising:
- a first filter component for detecting, prior to receiving the search query from the user, an undesirable content in one or more of a plurality of electronic documents and for modifying, prior to receiving the search query from the user, each of the one or more of the plurality of electronic documents having the detected undesirable content to alter the detected undesirable content included in the one or more of the plurality of electronic documents;
- a second filter component for detecting, in response to receiving the search query from the user and identifying the one or more electronic documents based on the received search query, an undesirable content in the presentation data of one or more of the identified electronic documents of the search result, said filter component being further configured to vary a format attribute of the presentation data of the identified undesirable content to prevent display of the identified undesirable content,
  - wherein varying the format attribute comprises varying the format attribute in accordance with one or more of the following: a language of the user and a locality of the user; and
- an interface component for providing the search result including the varied format attribute to prevent display of the undesirable content to the user.

34. The computer-readable media of claim 33, wherein the first filter component comprises a categorizing component for classifying the one or more identified electronic documents, and wherein the second filter component is configured to perform one or more of the following: communicating the detected undesirable content to the categorizing component to improve classification of the one or more identified electronic documents and improving detection of other undesirable contents of the presentation data having the detected undesirable content based on the detected undesirable content.

35. The computer-readable media of claim 33, wherein the second filter component is configured to include a notice in the presentation data having the detected undesirable content to indicate that one or more of the identified electronic documents may be undesirable.

36. The computer-readable media of claim 33, wherein the second filter component is configured to detect the undesirable content in the presentation data as a function of one or more of the following: a preference of the user, a default setting, and the received search query.

37. The computer-readable media of claim 33, wherein the interface component is configured to provide one of the identified electronic documents including any variations to the user in response to the user selecting said one of the electronic documents from the provided search result.

\* \* \* \* \*